(12) United States Patent
Kim

(10) Patent No.: US 10,717,249 B1
(45) Date of Patent: Jul. 21, 2020

(54) APPARATUS AND SYSTEM FOR REMOVING LIQUID FROM TOFU

(71) Applicant: Kyung Soo Kim, La Mirada, CA (US)

(72) Inventor: Kyung Soo Kim, La Mirada, CA (US)

( * ) Notice: Subject to any disclaimer, the term of this patent is extended or adjusted under 35 U.S.C. 154(b) by 0 days.

(21) Appl. No.: 16/541,655

(22) Filed: Aug. 15, 2019

(51) Int. Cl.
| B30B 9/06 | (2006.01) |
| A23P 30/10 | (2016.01) |
| B30B 1/20 | (2006.01) |
| A23L 11/00 | (2016.01) |
| A23C 20/02 | (2006.01) |

(52) U.S. Cl.
CPC ............... *B30B 9/06* (2013.01); *A23P 30/10* (2016.08); *B30B 1/20* (2013.01); *A23C 20/025* (2013.01); *A23L 11/07* (2016.08); *A23V 2002/00* (2013.01)

(58) Field of Classification Search
CPC .... B30B 9/04; B30B 9/06; B30B 9/26; B30B 9/262; B30B 1/18; B30B 1/20; A23L 11/07; A23L 1/2006; A23V 2002/00; A23C 20/025; A23P 30/00; F16H 25/2056; F16H 2025/2065; F16H 2025/2068; Y10T 74/18672
USPC ....... 100/110, 116, 125, 127, 289, 290, 292; 99/495; 74/89.35, 601
See application file for complete search history.

(56) References Cited

U.S. PATENT DOCUMENTS

| 2,173,733 A * | 9/1939 | Seybert ...................... A61L 2/06 422/300 |
| 3,404,580 A * | 10/1968 | Valenti ................ F16H 25/2056 74/89.35 |
| 4,580,577 A * | 4/1986 | O'Brien ............. A61B 10/0051 100/131 |
| 4,651,581 A * | 3/1987 | Svensson .................. B66F 3/10 74/89.35 |
| 4,958,557 A * | 9/1990 | Fiala ........................ A01J 25/15 100/125 |
| 5,419,250 A * | 5/1995 | Ferguson .............. A47J 19/005 100/125 |
| 5,701,810 A * | 12/1997 | Nakai ................... A23C 20/025 100/116 |
| 5,752,434 A * | 5/1998 | Kuan ...................... A01J 25/12 100/116 |
| 7,775,157 B2 * | 8/2010 | Kraft .................... A23C 20/025 426/478 |

(Continued)

*Primary Examiner* — Jimmy T Nguyen
(74) *Attorney, Agent, or Firm* — IPLA P.A.; James E. Bame

(57) ABSTRACT

Apparatus and system for controllably removing liquid from tofu with no or minimal cracking or deforming. An interior box contains tofu. Interior box is insertable and removable from exterior box. Interior box includes drain(s) for liquid removed from tofu, and resilient spacers on bottom to create space between bottoms of interior and exterior boxes for containing drained liquid and for cushioning tofu when pressed. A cover releasably attaches to top of nested boxes. Telescoping extender extends through cover into interior box. Extender is attached at one end to inside cover and attached at other end through a spring-loaded cap to a press plate. Extender has interior tier cylinder nested within exterior tier cylinder. Extender progressively telescopes interior cylinder out of exterior cylinder, and then telescopes exterior tier cylinder to extend press plate further into interior box to press tofu to release liquid. Spring-loaded cap on extender cushions pressure on tofu.

16 Claims, 7 Drawing Sheets

(56) References Cited

U.S. PATENT DOCUMENTS

| | | |
|---|---|---|
| 10,238,139 B2 | 3/2019 | Kittow et al. |
| 2004/0173041 A1* | 9/2004 | Said ........................ F16H 25/20 74/89.35 |
| 2017/0318856 A1* | 11/2017 | Kittow ...................... B30B 9/06 |

* cited by examiner

APPARATUS AND SYSTEM FOR REMOVING LIQUID FROM TOFU

BACKGROUND

The field of the invention relates to pressing materials such as foodstuffs, and particularly, relates to pressing tofu.

Tofu is a food product prepared by coagulating soymilk and then pressing the resulting curds into blocks of varying softness. Commercially, a block of tofu may come packed in a pool of liquid. The block of tofu may be used as is after removal from the pool of liquid, but some uses of the tofu call for it to be pressed to remove some or most of the liquid from the block. The removal of some or most of the liquid from the tofu may leave it better able to absorb spices, marinades, sauces, flavorings, broth and the like. The removal of some or most of the liquid from the tofu also may change the softness or density of the tofu.

There are challenges, however, to removing some or most of the liquid from the tofu. For example, the tofu may be wet when removed from its pool of liquid in the commercial container, and the block of tofu may drip that water making for a leaky mess. Another example is that pressing the tofu may squeeze out liquid that also may lead to a leaky mess. Further, another challenge to removing some or most of the liquid from tofu is what to use to press the liquid out of the tofu. Any heavy object may work, but it may come in contact with the tofu and become soiled with the tofu or the liquid pressed out of it. Also, an arbitrary heavy object may not exert pressure on the tofu uniformly and may result in uneven results in the tofu. Excessive pressure from a heavy object may result in the tofu deforming and/or cracking.

Thus, there may be a need for a way to remove some or most of the liquid from tofu that overcomes at least the challenges mentioned above.

SUMMARY OF THE INVENTION

Stated generally, the invention relates to an apparatus and system of removing liquid from tofu. For example, the invention may be embodied as a tofu press apparatus including a nested pair of boxes. The interior box holds the tofu. The interior box includes one or more drain holes in or near its bottom for draining the liquid removed from the tofu out of the interior box. The interior box also includes resilient spacers on its outside bottom. The resiliency of the spacers may cushion the tofu while it is being pressed to minimize deformation or cracking of the tofu. Also, the spacers create a space between the interior box and the exterior box when the boxes are nested. The space contains the liquid drained from the tofu.

The exemplary tofu press apparatus removes liquid from the tofu by pressing on it using a pressing plate attached to a two-tier telescoping extender. The exemplary tofu press provides a lid having an opening through which the two-tier telescoping extender extends into the interior of the nested boxes. The two-tier telescoping extender includes an interior tier cylinder and an exterior tier cylinder and associated elements. When the exemplary tofu press is activated, the interior tier cylinder of the two-tier telescoping extender progressively unscrews from its nested position within the exterior tier cylinder to a more extended position into the interior box. By extending further into the interior box, the interior tier extends a spring-loaded cone cap and pressing plate towards the tofu. When the interior tier cylinder reaches extension limit, then the exterior tier cylinder of the two-tier telescoping extender progressively unscrews from its nested position to a more extended position into the interior box, thereby causing the interior tier cylinder, the spring-loaded cone cap and pressing plate towards the tofu. At some point of the extension of the two-tier telescoping extender into the interior box, the pressing plate engages the tofu, and as the extension continues, the pressing plate progressively increases its pressure on the tofu, which may give up liquid in response.

When enough liquid has been removed from the tofu or when the extension of the two-tier telescoping extender and associated elements reaches its longest extension, the user may take action towards retrieving the pressed tofu. The user may unfasten the lid and remove the lid with the screw cap, two-tier telescoping extender and associated elements from the interior box to then retrieve the pressed tofu. Alternatively, the user may retract the two-tier telescoping extender and associated elements from their extension into the interior box. The user then may remove the lid, and retracted two-tier telescoping extender and associated elements from the interior box to then retrieve the pressed tofu.

Advantageously, the invention may provide a tofu press apparatus and system that may yield good results based on the minute control allowed the user over the pressing of the tofu. The minute control may be provided by the activator in the exemplary embodiments. Implementations of the invention may be unitary, self-contained apparatuses or systems that are easily assembled, used, cleaned, and/or stored. The embodiments of the invention may be made of lightweight materials and sized to hold a common commercial size of tofu. Yet, the embodiments may easily accommodate tofu blocks of varying sizes and heights. The implementations may assist in minimizing mess involved in removing liquid from tofu. Drain holes in the interior box holding the tofu drain the removed liquid from the interior box. The drained liquid is contained within a space between the bottoms of the interior box and the exterior box. The pressed tofu may be removed with or without the interior box, but in both cases leaving the removed liquid behind in the exterior box. Exemplary embodiments minimize clean up after pressing the tofu. Once the pressed tofu is removed from the interior box, the only elements of the exemplary embodiment that may need cleaning are the pressing plate, the interior box, and the exterior box.

Other advantages of the exemplary embodiments of the invention may include the minute control the user may have over the pressing process as a result particular elements of the embodiments of the invention. For example, the telescoping extender and associated elements may be made to progressively move into the interior box and press the tofu at a rate under the user's control in twisting the screw cap. As the pressing plate encounters the tofu, the user may slow the extension of the telescoping extender and associated elements, thereby slowing the exertion of pressure on the tofu so the user may best judge the appropriate pressure to apply to the tofu. Further, the spring-loaded cap attached to the pressure plate and the spacers underneath the interior box may provide cushioning to the tofu to avoid or minimize deformity and cracking of the tofu while being pressed.

Yet another advantage of an exemplary embodiment of the invention is that it may include a transparent or substantially transparent exterior box or at least be transparent or substantially transparent near bottom sides of the exterior box. This feature may allow a user to see how much liquid has been removed from the tofu during the pressing process and to judge if enough liquid has been removed to achieve the level of "wetness" of tofu the user prefers. These and other advantages may be offered by the embodiments of the invention as now described.

A first embodiment of the invention is an apparatus for removing liquid from tofu. This embodiment provides an open topped nested double-box set. The double-box set includes an interior box for containing the tofu and an exterior box. The interior box is insertable into and removable from within the exterior box. The interior box may include at least a drain in or near the bottom of the interior box for draining the liquid removed from the tofu out of the interior box. The interior box may include at least a spacer disposed under the bottom of the interior box for creating a space between the bottom of the interior box and the inside bottom of the exterior box with the space for containing the removed liquid drained from the interior box. Also, the spacer disposed under the bottom of the interior box may be a resilient spacer for cushioning the tofu when the tofu is pressed by the pressure plate.

The first embodiment includes a cover for covering and releasably attaching to the open topped nested double-box set. The cover may include an opening into the inside of the interior box. This embodiment also provides a telescoping extender extending generally vertically into the inside of the interior box. The extender may be attached at one end to the inside of the cover and attached at the other end to a substantially horizontal pressure plate. The extender may be connected to the pressure plate through a spring-loaded cap that may act as a shock absorber with respect to the pressure plate pressing on the tofu. The extender may be attached via a screw function to the cover. Specifically, the cover may include a collar on the underside of the cover. The collar may be considered a collar tier for the telescoping extender in that an interior tier cylinder may nest substantially within the exterior tier cylinder, which, in turn, may nest substantially within the collar tier.

The extender is activatable to become longer by the extender telescoping the interior tier cylinder out of the exterior tier cylinder and may extend further by the exterior tier cylinder telescoping out of the collar tier, thereby extending the pressure plate further into the inside of the interior box to press on the tofu to cause the tofu to release the liquid. An activator such as a screw cap may be disposed on and connected through the opening in the cover to the extender for activating the extender. Per this embodiment, at least some liquid is removed from the tofu by the pressure plate being extended by the extender into the inside of the interior box to press on the tofu. In this embodiment, the extender may be de-activatable by the activator at any point along the progressive lengthening of the extender to stop further press by the pressure plate on the tofu.

Advantageously, the invention provides a system as a second embodiment. The system is directed towards removing at least some liquid from tofu and collecting at least some of the removed liquid. The system includes an outer container having an interior and an open top. The system also includes an inner container for holding the tofu. The inner container fits into the interior of the outer container. The inner container has at least a drain in or near the bottom of the inner container.

The inner container includes a means for raising the inner container above the inside bottom of the interior of the outer container to create a space to contain at least some of the liquid removed from the tofu. The means for raising the inner container above the inside bottom of the interior of the outer container may include two or more resilient feet disposed on the outside bottom of the inner container. The resiliency of the feet may assist in minimizing deforming or cracking the tofu when the tofu is pressed. The inner container may be removable from the outer container. For example, once the removed liquid is contained in the exterior container, the inner container may be removed from the outer container for retrieval of the pressed tofu, and the contained liquid may be removed by pouring the contained liquid from the outer container.

In addition, the exemplary system provides a lid for releasably covering the open top of the outer container, and a means for pressing the tofu to remove the liquid from the tofu.

Per the exemplary system, the means for pressing is connected to the underside of the lid so the means for pressing extends into the interior of the inner container to a neutral, non-pressing distance. The means for pressing may include a substantially horizontal plate for pressing the top of the tofu in the inner container. The means for pressing is extendable further into the interior of the inner container to press the tofu to cause removal of at least some liquid from the tofu with at least some of the removed liquid draining from the inner container into the space between the bottom of the inner container and the bottom of the outer container. In this exemplary system, the means for pressing is retractable to the neutral, non-pressing distance. The means for pressing may be removable from the interior of the inner container.

The system also may provide the means for pressing with additional or assisting elements. For example, the means for pressing may include or be associated with a horizontally rotatable element on the top of the lid. The horizontally rotatable element may be a screw top covering an opening in the lid into the interior of the outer container. A rod may be engaged at one of its ends with the horizontally rotatable element. The rod may extend through the lid into the interior of the inner container. The rod may cooperate with the horizontally rotatable element to turn when the horizontally rotatable element is turned.

In addition, the system may provide the means for pressing with an extending and retracting means. It may cooperate with the rod for extending the means for pressing from the neutral, non-pressing distance further into the interior of the inner container to press the tofu. The extending and retracting means also may cooperate with the rod for retracting the means for pressing to the neutral, non-pressing distance.

Further, the system may provide the extending and retracting means with a collar, a turning cylinder, an encompassing cylinder, a turning cylinder, and a substantially horizontal plate. The collar may downwardly protrude from the inside of the lid and be centered about the rod. The collar may have at least a top node on and protruding into the inside of the collar near the top of the collar adjacent the inside of the lid. The collar may have at least a bottom node on and protruding into the inside of the collar near the bottom of the collar. Also, the collar may have at least a stop on and protruding into the inside of the collar near the bottom of the collar.

The turning cylinder of the extending and retracting means may have a top with an opening. It may receive the rod into the interior of the turning cylinder. The opening in the top of the turning cylinder may cooperate with the rod so the turning cylinder turns when the horizontally rotatable element turns the rod. Also, the turning cylinder may have a turning thread on the outside of the turning cylinder spiraled downwardly from near the top of the turning cylinder to near the bottom of the turning cylinder.

The encompassing cylinder of the extending and retracting means may have an encompassing thread on the outside of the encompassing cylinder spiraled downwardly from near the top of the encompassing cylinder to near the bottom of the encompassing cylinder. The encompassing cylinder may have at least an encompassing top node on and protruding into the inside of the encompassing cylinder near the top of the encompassing cylinder. The encompassing cylinder may have at least an encompassing bottom node on and protruding into the inside of the encompassing cylinder near the bottom of the encompassing cylinder. The encompassing cylinder may have at least an encompassing stop on and protruding into the inside of the encompassing cylinder near the bottom of the encompassing cylinder.

Advantageously, the system may provide that the turning cylinder is positionable substantially within the encompassing cylinder for the neutral, non-pressing distance of the extending and retracting means. This may be provided by screwing the turning cylinder in a first direction substantially into the encompassing cylinder using the encompassing top node and the encompassing bottom node of the encompassing cylinder to guide the thread on the outside of the turning cylinder. The turning cylinder may be extendible from the neutral, non-pressing distance further into the interior of the inner container so long as the horizontally rotatable element rotates to turn the rod which turns the turning cylinder in a second direction so the turning cylinder unscrews from the encompassing cylinder with the guidance of the encompassing top node and the encompassing bottom node of the encompassing cylinder until the encompassing stop, protruding into the inside of the encompassing cylinder near the bottom of the encompassing cylinder, stops the unscrewing of the turning cylinder and leaves the turning cylinder connected to the encompassing cylinder;

The substantially horizontal plate of the extending and retracting means may be connected on its top side to the end of the turning cylinder. The plate may move with the turning cylinder to the neutral, non-pressing distance of the extending and retracting means when the turning cylinder is positioned within the encompassing cylinder within the collar. The plate may extend further into the interior of the inner container in response to the turning cylinder extending further into the interior of the container. The underside of the plate presses the top of the tofu in the inner container when the plate is extended sufficiently to reach the tofu. The plate exerts more pressure on the tofu as the plate continues to extend further into the interior of the inner container until the turning cylinder and the encompassing cylinder stop unscrewing from the collar and from each other.

The invention provides a third embodiment directed to tofu press. It includes a lid having a central opening. A collar extends upwardly from the circumference of the central opening. A string rail is formed around the outer surface of the collar. The third embodiment provides a round cap with its inside circular wall of the cap divided between a circular upper valence and a circular lower valence. The circular upper valence includes a circular line of nodes. The circular lower valence includes inner peripheral surface nodes. The round cap is attachable to the collar by the circular line of nodes interacting with the string rail of the collar, thereby allowing the round cap to freely rotate in either direction about the collar.

The tofu press of the third embodiment provides a ribbed rod extending downwardly from the inside center of the cap. The third embodiment also provides a first extender having a base and a first cylinder extending from the outer periphery of the base. It has an opening to receive the ribbed rod therethrough. The first cylinder has a threaded outer surface, which includes a pair of thread stops respectively at an upper part and a lower part of the threaded outer surface. The thread stops at the upper part are max-spaced from each other at the end of a chosen diameter line. The thread stops at the lower part are max-spaced from each other at the opposite end of the chosen diameter line.

The third embodiment further includes a second extender having an inner peripheral surface and a threaded outer peripheral surface. A line of nodes are formed on the inner peripheral surface of the second extender to fit in a trough of the threaded outer peripheral surface of the first extender to control threading of the first extender against the second extender and contain the threading between the thread stop pair at the upper part of the first extender and the thread stop pair at the lower part of the first extender. The first extender is rotatable by rotation of the round cap to threadedly lower from the base until the upper thread stops of the first extender become hooked by the nodes on the inner peripheral surface of the second extender. The second extender is rotatable in response to continued rotation of the round cap to threadedly lower from the base until the upper thread stops of the second extender become hooked by the nodes on the inner peripheral surface of the lower valance of the lid.

In addition, the third embodiment provides a spring having a top and a bottom. The top of the spring is worn over the rod and is in contact with a lower surface of the lid. The bottom of the spring is covered by a support attached to a press board. The third embodiment provides that rotation of the cap moves the first extender away from the base, which further moves the second extender away from the base so the top of the spring in contact with the lower surface of the lid elastically moves away from the base so the support pushes down the board to press a tofu block.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the invention will become better understood with reference to the following drawings and detailed description.

BRIEF DESCRIPTION OF THE DRAWINGS

The figures which accompany the written portion of this specification illustrate embodiments for the invention constructed and operative according to the teachings of the invention, where the various embodiments of the invention will hereinafter be described in conjunction with the appended drawings, wherein like designations denote like elements. Unless otherwise specifically noted, articles depicted in the drawings are not necessarily drawn to scale.

DETAILED DESCRIPTION OF THE INVENTION

Figure 1:
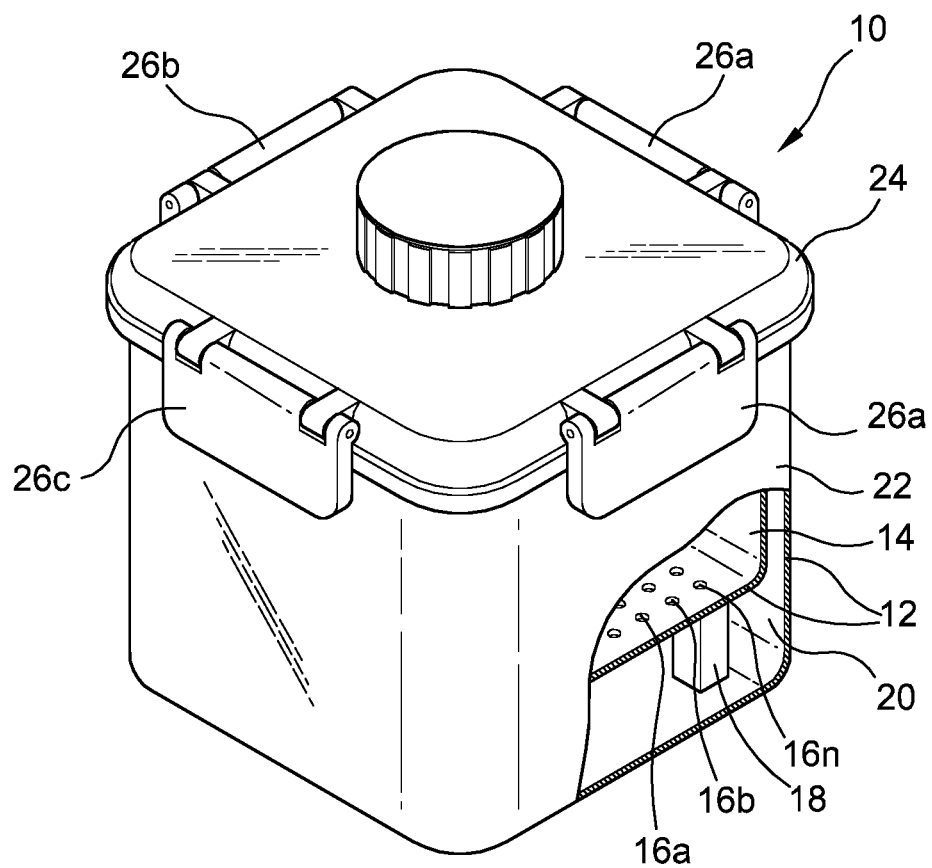
FIG. 1 is a perspective view of an exemplary embodiment of the invention.

The invention is described herein with reference to exemplary embodiments, alternative embodiments, and also with reference to the attached drawings. The exemplary embodiments that are described and shown herein are only examples of the ways to implement the invention. The invention, however, may be embodied in many different forms and carried out in a variety of ways, and should not be construed as limited to the embodiments set forth herein. Modifications, additions, or omissions may be made to the elements, apparatuses, systems, and methods described herein without departing from the scope of the invention. For example, the components of the apparatus and system may be integrated or separated. Moreover, the operations of the apparatus and system disclosed herein may be performed by more, fewer, or other components, and the method described may include more, fewer, or other steps performed in any suitable order. In terms of nomenclature herein, the singular includes the plural, the masculine includes the feminine and/or neutral, a person includes a corporation, and/or a partnership (and/or the like), and an embodiment, in whole or in part, may be an apparatus, a device, a kit, a method, and/or a system, unless otherwise noted. Generally, the terms "and" and "or" may be interchangeable unless otherwise noted or understood from context. Moreover, like numerals indicate like elements throughout the figures.

Embodiments of the invention relate to an apparatus, a system, or a method for removing liquid from tofu. The invention or its embodiments may be referred to herein as a "tofu press," "tofu press apparatus," "tofu pressing box," "tofu press machine," or "tofu squeezing device." "Tofu" also may be referred to as "bean curd" or "soy bean curd." Further, reference herein is made to draining, pressing, or removing "liquid" from tofu. This liquid may be water or other liquid such as the liquid in which tofu is packed in commercial containers. All or only some of the liquid may be pressed out of the tofu.

Also, the invention and its embodiments are described herein as used in removing liquid from tofu, but the invention and its embodiments may be used in removing liquid from other foodstuff or even other materials. Moreover, the invention and its embodiments may be used in removing materials such as gel, sap, etc., other than liquid. In addition, the invention and its embodiments may be used in pressing materials. Other uses will occur to those skilled in the art.

Overview of Assembly and Use of an Exemplary Embodiment

Stated generally, the invention relates to an apparatus ad system of removing liquid from tofu. An exemplary embodiment may come pre-assembled ready for use as a tofu press. However, the exemplary embodiment may have to be assembled so its assembly is now presented as if a user had to assemble the embodiment prior to use.

To make use of an exemplary embodiment of the invention, in general terms, a user may place a block of tofu on the bottom of the interior box of a nested pair of boxes in preparation for removing the liquid from the tofu. The user then may assemble other elements of the exemplary tofu press. For example, the user may attach a screw cap to a top collar encircling a centralized opening in a lid that is used to cover the nested pair of boxes. The user then may attach a ribbed rod to the underside of the screw cap, so the rod extends through the centralized opening in the lid. The next step is to add the telescoping extender to the ribbed rod as explained next.

In this exemplary embodiment, the telescoping extender includes an exterior tier cylinder and interior tier cylinder. Both tiers are generally cylindrical in shape with the interior tier cylinder having a slightly smaller diameter. In putting the telescoping extender together, the user may nest the interior tier cylinder within the exterior tier cylinder of the telescoping extender by screwing or threading the interior tier cylinder into the exterior tier cylinder. The interior tier cylinder has a top with an opening. The opening in the top of the interior tier cylinder matches the rib pattern of the ribbed rod mentioned in the previous paragraph as being attached to the underside of the screw cap.

In further assembling the telescoping extender, the user may insert the ribbed rod through the matching opening in the top of the interior tier cylinder. The interior tier cylinder is nested within the exterior tier cylinder so inserting the ribbed rod into and through the opening in the top of the interior tier cylinder mounts the exterior tier cylinder as well as the interior tier cylinder. The nested interior tier cylinder and exterior tier cylinder may be moved on the ribbed rod until the exterior tier cylinder reaches an inner collar disposed around the bottom of the centralized opening in the lid. The user then may connect the exterior tier cylinder including its nested interior tier cylinder to the inner collar. The exterior tier cylinder with its nested interior tier cylinder may be screwed into or threaded into the inner collar of the centralized opening. This may be referred to as the "nesting position" or "nested position" of the telescoping extender.

Next, in the assembly of the telescoping extender, the user may position a spring at least partially around the ribbed rod, attach a cone cap to the end of the spring, and cause the spring to compress enough so the cone cap at its widest end is adjacent to the lower end of the interior tier cylinder of the telescoping extender. The user may place a connecting ring over the cone cap to fasten it at its widest end to the lower end of the interior tier cylinder of the telescoping extender. Then, the user may attach a substantially horizontal flat pressing plate to the tip end of the cone cap attached to the telescoping extender. The spring, cone cap, connecting ring, and pressing plate may be referred to the associated elements of the telescoping extender.

Once the telescoping extender with associated elements is assembled as noted above, the user may move the lid with its assembly of elements to cover the nested pair of boxes so the connected telescoping extender with associated elements extends through the opening in the lid into the inside of the interior box. The user attaches the screw cap to the top collar around the opening in the lid, if the screw cap is not already attached. Then the user may close fasteners on the lid, so the lid is securely connected to at least the exterior of the nested pair of boxes. At this point in the assembly of the exemplary tofu press, before pressing of the tofu, the telescoping extender with associated elements are inside the interior box with the lid fastened onto the nested pair of boxes and the screw cap is attached to the top collar around the opening in the lid.

To begin removal of liquid from the tofu, the user turns the screw cap in a first direction, which causes the telescoping extender with associated elements to begin progressively extending the pressure plate towards the tofu. Specifically, turning the screw cap in the first direction causes the ribbed rod to turn against the opening in the top of the interior tier cylinder nested within the exterior tier cylinder of the telescoping extender. The continued turning of the ribbed rod causes the interior tier cylinder to progressively unscrew via its screw thread from the exterior tier cylinder of the telescoping extender and to move further into the inside of the interior box towards the tofu. Being connected to the spring-loaded cone cap, the progressive movement of the interior tier cylinder away from its nested position inside the exterior tier cylinder of the telescoping extender causes the pressing plate also to move progressively towards the tofu.

As the screw cap continues to be turned in the first direction by the user, the interior tier cylinder completes its movement towards the tofu by being stopped with the top of the interior tier cylinder connected to the bottom of the exterior tier cylinder. Once the interior tier cylinder stops its downward movement, if the user continues to turn the screw cap in the first direction, the exterior tier cylinder begins to unscrew from its attachment to the inner collar. As the exterior tier cylinder moves downwardly into the interior box, the exterior tier cylinder causes the interior tier cylinder, the spring-loaded cap, and the pressing plate to move progressively closer to the tofu. At some point in the extension of the telescoping extender, the pressure plate may engage the tofu. The point at which the pressure plate engages the tofu may depend on the height of the tofu.

With the continued turning of the screw cap in the first direction by the user, the pressing plate continues progressively to extend into the interior box and to press more on the tofu. As the pressure on the tofu mounts, the tofu releases liquid so the tofu may contract in height. When the user decides sufficient liquid has been removed from the tofu, the user may cease turning the screw cap in the first direction to cease additional movement or pressing of the pressing plate against the tofu. Alternatively, the telescoping extender may reach its extension limit so further turning of the screw cap in the first direction has no further extension results and no further additional pressure exerted on the tofu.

At either point, the user may decide to remove the tofu from the exemplary tofu press. To do so, the user may begin removal of the telescoping extender and associated elements from inside the interior box. A quick way to remove the telescoping extender and associated elements is to simply unfasten the fasteners on the lid and pull the lid with the telescoping extender and associated elements in an extended position out of the interior of the interior box. The user then may remove the interior box and retrieve the drained tofu.

An alternative way to remove the telescoping extender and associated elements from the interior box is to retract them to their nested position. As with the extension of the telescoping extender and associated elements, their retraction may be progressive. To begin the retraction, the user twists the screw cap in a second direction opposite to the first direction. Twisting the screw cap in the opposite direction causes the ribbed rod extending from the screw cap into the interior tier cylinder of the telescoping extender to cause the interior tier cylinder to turn and progressively move itself via its screw thread towards its nested position within the exterior tier cylinder, thereby pulling the connected spring-loaded cap and the pressure plate progressively along towards the top of the interior box.

When the interior tier cylinder returns to its nested position within the exterior tier cylinder of the telescoping extender, as the screw cap continues to be turned in the second direction by the user, the exterior tier cylinder then moves progressively via its screw thread to its own nested position within the inner collar of the opening in the lid covering the nested pair of boxes. The upward movement of the exterior tier cylinder pulls the pressure plate with spring-loaded cap progressively along towards the top of the interior box. The user then may unfasten the lid from the nested pair of boxes and remove the screw cap with telescoping extender and associated elements from inside the interior box. Of course, the user does not have to retract the telescoping extender and associated elements all the way possible towards their nesting position, but may stop the retraction, unfasten the fasteners, and lift the lid away to reveal the interior box with the drained tofu.

The user may choose to lift the interior box out of the exterior box, thereby lifting the tofu removed of at least some of its liquid in the interior box but leaving the removed liquid in the exterior box to which the removed liquid has drained through the holes in or near the bottom of the interior box. To use the tofu removed of at least some of its liquid, the user then may remove the tofu from the interior box. The user may be rid of the removed liquid (or use it for another purpose) by pouring the removed liquid out of the exterior box.

The discussion is this section has been to provide the reader with an overview of the assembly and use of an exemplary embodiment of the invention. Additional details and alternative embodiments are provided below with reference to the figures.

Details of Exemplary Embodiments Described in Connection with the Figures

FIG. 1 is a perspective view of an exemplary embodiment 10 of the invention. Specifically, FIG. 1 shows an implementation of a tofu press 10 according to the invention in a closed position such as may be used when the tofu press 10 is to be stored. The closed position shown in FIG. 1 also may illustrate an "in use" position of the tofu press 10 when it is being used to remove liquid from tofu 13.

Figure 2:
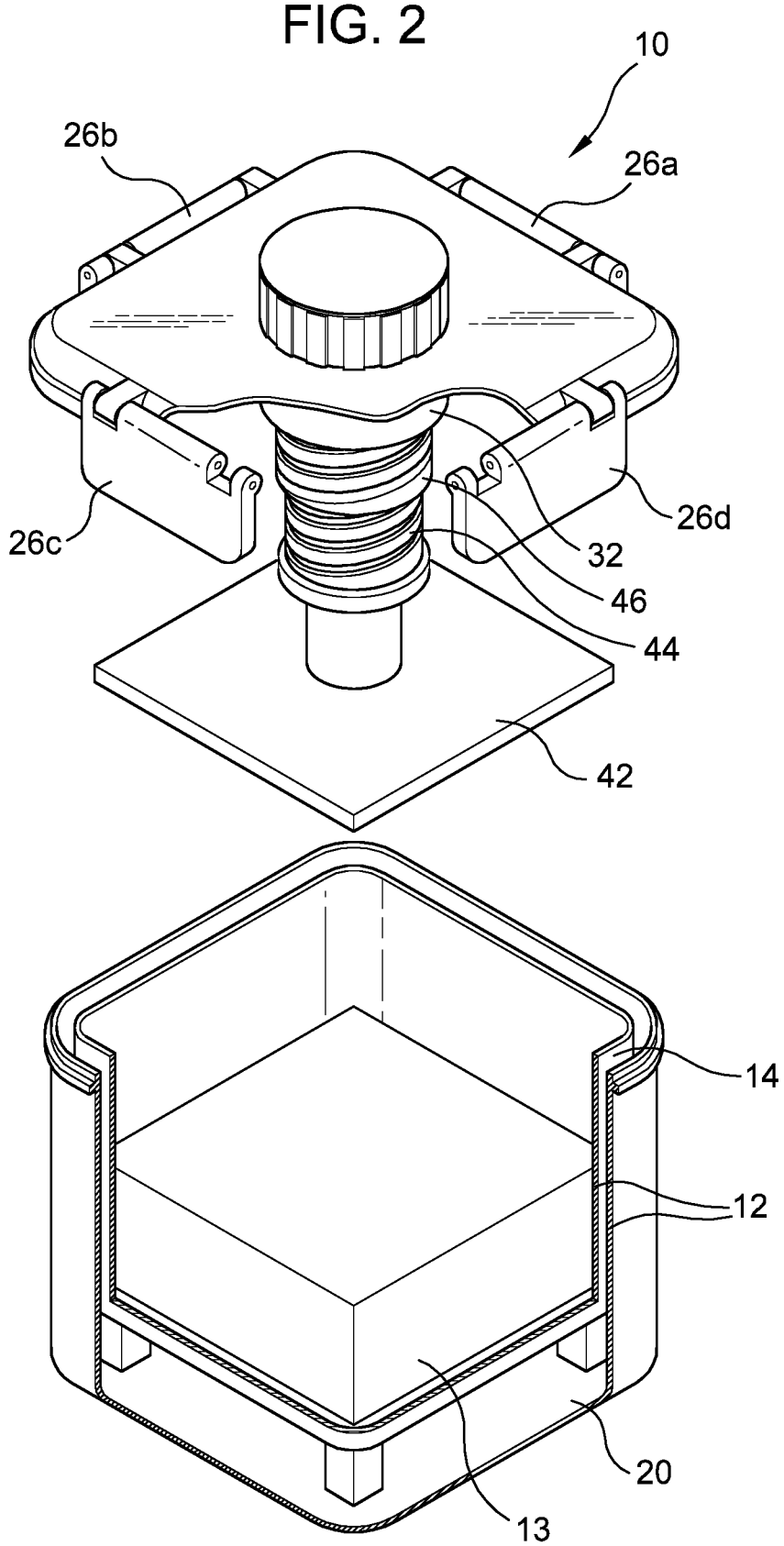
FIG. 2 is a perspective exploded view of an exemplary embodiment of the invention.

As seen in FIG. 2, the exemplary tofu press 10 includes an open topped nested double-box set 12. In the exemplary tofu press 10, the double-box set 12, and thus, a lot of the other elements in the tofu press 10 are substantially rectangular or accommodate one or more rectangular elements. One of the reasons for the rectangularity is that commercial blocks of tofu 13 are generally sold in rectangular form. Nonetheless, other embodiments of the invention are not limited to rectangularity, but may be other shapes.

The nested double-box set 12 may include two elements that may be referred to by different terms. The nested double-box set 12 may include an interior box 14 and an exterior box 22. The interior box 14 also may be referred to as an inner container, and the exterior box also may be referred to as an outer container.

The open topped nested double-box 12 includes an interior box 14 that may be positioned within an exterior box 22 or "nested" with the exterior box 22. In the exemplary embodiment, the interior box 14 fits "just within" the exterior box 22 with little space between the respective side walls of the interior box 14 and the exterior box 22. Other embodiments may vary.

The interior box 14 is for containing the tofu 13 on the inside bottom of the interior box 14. An alternative embodiment may provide a separate plate or plate with removal elements for placement of the tofu 13 so the separate plate or plate with removal elements may be removed from the interior box 14 when the tofu 13 is pressed.

The interior box 14 in the exemplary implementation 10 is generally rectangularly shaped with an open top. Advantageously, the interior box 14 may have side walls and a bottom that may be sized to just contain a common commercial size of tofu 13. The height of the interior box 14, however, may be sized to allow for the implementation of the tofu press 10 elements as explained herein. The interior box 14 may be made of any material appropriate to the function such as plastic.

An advantage of the invention is the interior box 14 may include features that assist in eliminating or minimizing deformation or cracking of the tofu 13 as it is pressed. For example, the interior box 14 may include one or more drains 16a, 16b, 16n in or near the bottom of the interior box 14 for draining the liquid removed from the tofu 13 out of the interior box 14. The drains, for example, may be holes or openings through the bottom or near the bottom of the interior box 14.

Another example of an advantageous feature provided by the interior box 14 to the exemplary tofu press 10 is the one or more spacers that may be disposed under the bottom of the interior box 14. In an embodiment of a tofu press 10 according to the invention (not shown), four (4) spacers are disposed respectively in each of the corners of the outside bottom of the interior box 14. The exemplary tofu press 10 in FIG. 1 shows multiple spacers arrayed in rows across the bottom of the interior box 14. Whatever number of spacer(s) is used in an exemplary embodiment, the spacer(s) may create a space between the bottom of the interior box 14 and the inside bottom of the exterior box 22. The space 20 created by the spacer(s) 18 of the interior box 14 may be used for containing the liquid removed from the tofu 13 and drained through the drain(s) 16a, 16b, 16n from the interior box 14. The one or more spacers may be integrally made with the interior box 14 or may be one or more separate elements attached to the interior box 14. The one or more spacers may be made from any appropriate material.

Yet another advantage of the spacer(s) 18 is that they may be made (in part or in whole) of a resilient material. The resiliency of the material allows the spacer(s) 18 to cushion the tofu 13 as it comes under pressure from other elements of the tofu press 10. In other words, the resiliency of the material allows the spacer(s) 18 to "give way" at least a bit when pressure is exerted on top of the tofu 13, so the tofu 13 is less susceptible to being deformed and/or to cracking from the pressure.

As mentioned, the other box in the open-topped nested double-box set 12 is the exterior box 22. It cooperates in the exemplary tofu press 10 with the interior box 14, which may be readily insertable into the exterior box 22 and readily removable from it. For example, in use of the exemplary tofu press 10, a user may remove the interior box 14 from the exterior box 22 to insert the tofu 13 into the interior box 14. The user then may return the interior box 14 to nest within the exterior box 22 and take action to press the tofu 13. Alternatively, the user may simply drop or place the tofu 13 into the interior box 14 when the two boxes 14, 22 are nested.

During the pressing, liquid leaves the tofu 13 and drains through the drain(s) 16a, 16b, 16n in the interior box 14 into the space 20 created in the inside bottom of the exterior box 22 by the spacer(s) 18 of the interior box 14. Advantageously, the drained, removed liquid is contained in the space 20 of the exterior box 22 until the user is ready to remove the liquid. To do so, the user simply may remove the interior box 14 from the exterior box 22, and then pour the contained liquid out of the exterior box 22.

The exterior box 22 may include a feature not shown in the illustrations, but that may be a convenience feature for the user. The exterior box 22 may include a drain with a plug that is workable from the outside of the exterior box 22. With an exterior drain plug, the user does not have to remove all of the other elements of the tofu press 10 to drain the liquid removed from the tofu 13 from the exterior box 22. The drain plug may be made integrally with the exterior 22.

Like the interior box 14, the exterior box 22 may be made of any material appropriate to its function such as plastic. An advantageous feature of the exterior box 22 may be that all of the exterior box 22 or just the bottom sides of the exterior box 22 may be made of clear or nearly clear material so that a user may view how much liquid removed from the tofu 13 has accumulated in the space 20 between the interior box 14 and the exterior box 22.

Figure 3:
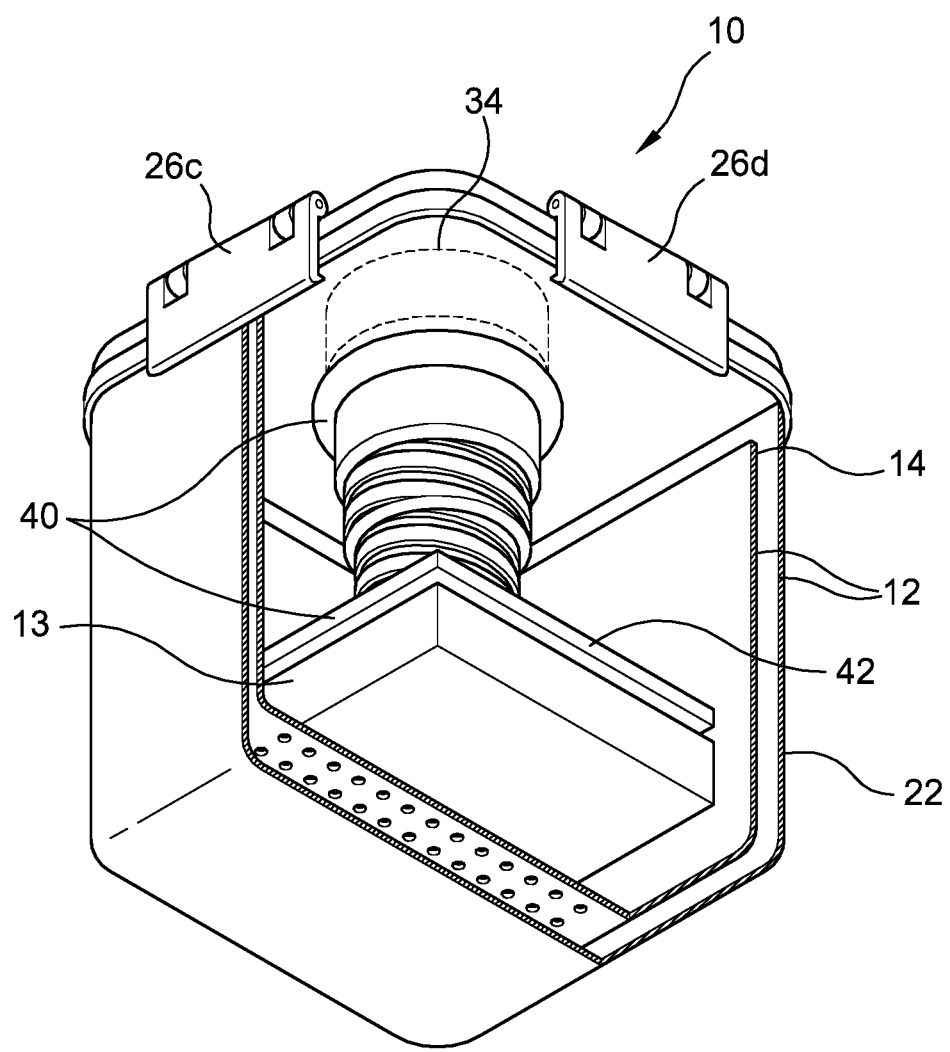
FIG. 3 is a perspective view with one wall cutaway of an exemplary embodiment of the invention.

FIGS. 1-3 illustrate that the exemplary tofu press 10 includes a cover 24 that covers the top of the open topped nested double-box set 12 including the interior box 14 and the exterior box 22. The cover 24 also may be referred to as a "lid." The cover 24 is releasably attached to the double-box set 12 in any appropriate manner. For example, a cover may be snap fit onto the upper edge of an exterior box in an alternative implementation of the invention. As another example, FIGS. 1, 2 and 3 illustrate the cover 24 of the exemplary tofu press 10 with hinged fasteners 26a, 26b, 26c, and 26d. In FIGS. 1 and 3, the hinged fasteners 26a, 26b, 26c, and 26d are closed or fastened over the double-box set 12. In the exploded illustration of elements of the exemplary tofu press 10 in FIG. 2, the hinged fasteners 26a, 26b, 26c, and 26d are shown in an open position, which releases the cover 24 from attachment to the double-box set 12. Cover 24 may be made of any material appropriate to the function such as plastic.

Figure 4:
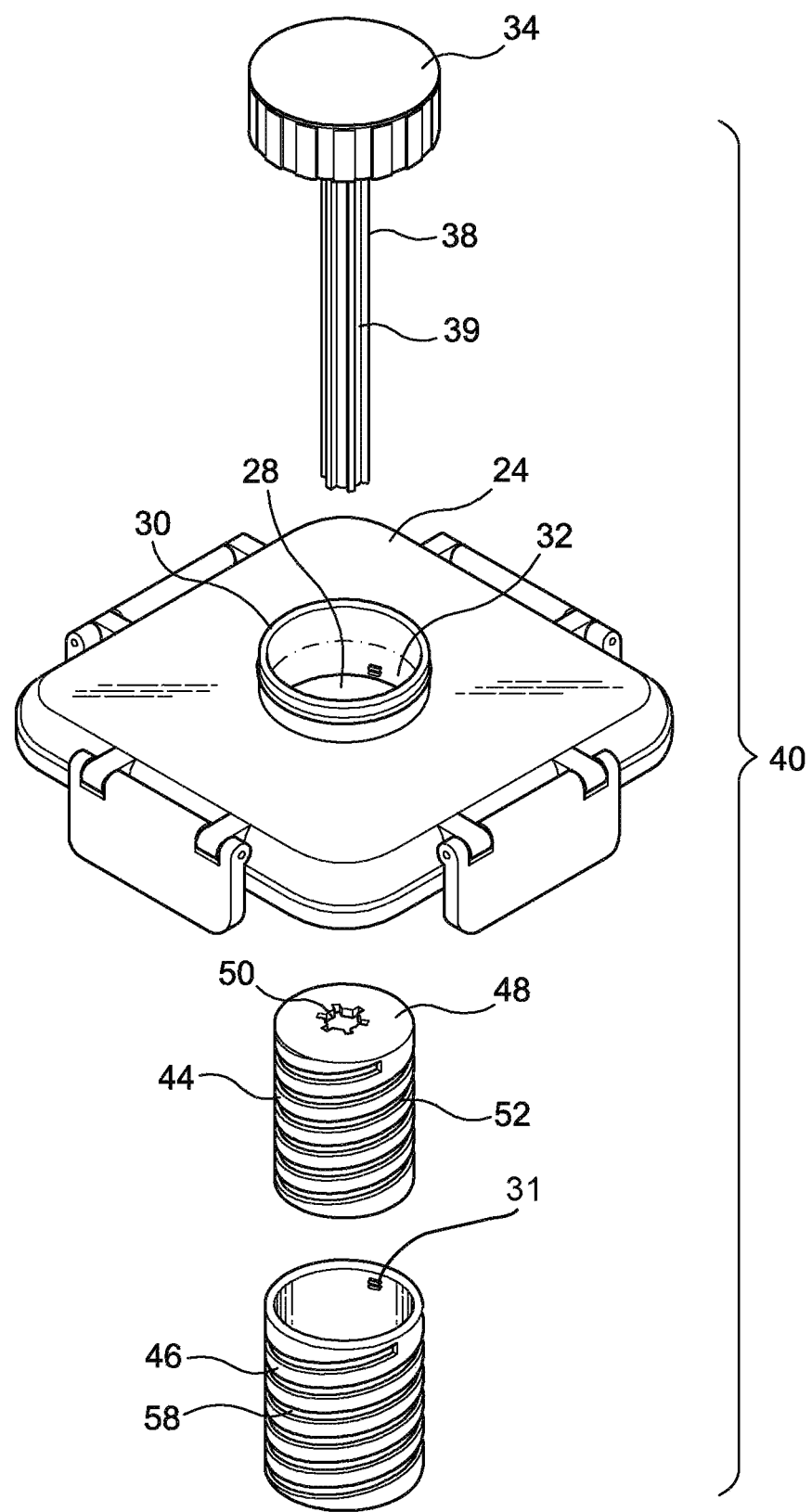
FIG. 4 is a perspective exploded view of elements of an exemplary embodiment of the invention.

FIG. 4 differs from FIGS. 1-3 in that FIG. 4 shows an exploded view of a few of the elements of the tofu press 10 including the screw cap 34, rod 38, cover 24 with opening 28, top collar 30 around the top of the opening 28 in the cover 24, inner collar 32 around the bottom or inside of the opening 28 in the cover 24, an interior tier cylinder 44, and an exterior tier cylinder 46. Some of these elements shown in FIG. 4 may be collectively referred to as the "means for pressing." The exploded view of FIG. 4 reveals the hole or opening 28 in the cover 24, which opening 28 is not visible in the earlier figures. The hole or opening 28 is centrally positioned and generally round in shape. The opening 28 also may be referred to as the central opening.

FIG. 4 shows the opening 28 in the cover 24 as including two collars: top collar 30 and inner collar 32. Top collar 30 is disposed about the outer top or top circumference of the opening 28 in the cover 24 and extends upwardly. Top collar 30 includes screw thread 36 on its exterior. Inner collar 32 is disposed about the bottom or bottom circumference of the opening 28 and extends below the opening 28 towards the inside of the interior box 14. The collars 30 and 32 may be made integrally with the cover 24, or either or both may be separate elements attached to the cover 24. The collars 30 and 32 may be made of any appropriate material such as plastic.

The top collar 30 also may be referred to simply as the "collar" when the inner collar 32 is referred to as the "base." The screw thread 36 of the collar may be referred to as a string rail.

FIGS. 1-5 show that a screw cap 34 covers the opening 28 in the cover 24 of the exemplary tofu press 10. The screw cap 34 is shaped as a fairly short cylinder with a top having a diameter that allows for the screw cap 34 to cover the opening 28 in the cover 24. The screw cap 34 cooperates with the top collar 30 of the opening 28 so the screw cap 34 rotates about the opening 28 in either a clockwise or counter-clockwise direction. Specifically, the screw cap 34 may have guidance nodes (not seen in the figures) on its interior collar to interact with the screw thread 36 on the outside of the top collar 30 of the opening 28. A user turns the screw cap 34 to cause it to turn and activate other elements of the exemplary tofu press 10 as described below. The screw cap 34 is configured with the top collar 30 to turn continuously in whatever direction the user turns the screw cap 34. As is described below, the turning of the screw cap 34 causes other elements of the exemplary tofu press 10 to react. The screw cap 34 may be made of any appropriate material such as plastic. The screw cap 34 also may be referred to as an "activator" or a "horizontally rotatable element" herein.

The screw cap 34 also may be referred to as a "round cap." It may have an inside ciruclar wall divided between a circular upper valence and a circular lower valence. The circular upper valence may include a circular line of nodes with the circular lower valence having inner peripheral surface nodes. The round cap may be attachable to the collar by the circular line of nodes interacting with the string rail of the collar allowing the round cap to freely rotate in either direction about the collar.

As noted, exemplary tofu press 10 makes use of a screw cap 34 as an activator. Activation of the activator by a user may begin operation of the exemplary tofu press 10, and continued activation of the activator by the user may continue the operation of the tofu press 10. Once the user ceases activation of the activator, the operation of the exemplary tofu press 10 stops. Other embodiments may vary with respect to the activation of a tofu press 10 according to the invention.

The screw cap 34 is connected in the exemplary embodiment 10 to a telescoping extender 40 that may extend generally vertically into the inside of the interior box 14 through the opening 28 in the cover 24. The telescoping extender 40 may be attached at its top or upper end to the inside of the cover 24. For example, the telescoping extender 40 may be attached to the underside of the screw cap 34 that covers the opening 28. At its other or lower end, the telescoping extender 40 may be attached to a substantially horizontal pressure plate 42.

FIG. 4 shows, specifically, the telescoping extender 40 may include a rod 38. At its top or upper end, the rod 38 may be attached to the inside or underside of the lid 24, and in particular, to the inside or underside of the screw cap 34. Preferably, the rod 38 is ribbed in its longitudinal direction having a plurality of ribs running along the length of the rod 38. In FIG. 4, only one rib 39 is visible. A rib is a longitudinal protrusion from the rod 38. In the preferred embodiment 10, there are six (6) ribs set around the rod 38 with each of the six (6) ribs being parallel to each other and spaced equidistant apart from each other. Other embodiments may vary. Also, in the preferred embodiment, the rod 38 has a length sufficient to support the extension of the interior tier cylinder 44 and the exterior tier cylinder 46 as is explained below. The rod 38 may be made of any appropriate material such as plastic.

In assembling the exemplary embodiment 10 for tofu pressing, the user may attach the rod 38 to the underside of the screw cap 34 and insert the rod 38 through the opening 28 in the lid 24. The user then may attach the interior tier cylinder 44 to the rod 38 as may best be seen in FIG. 4.

Figure 6:
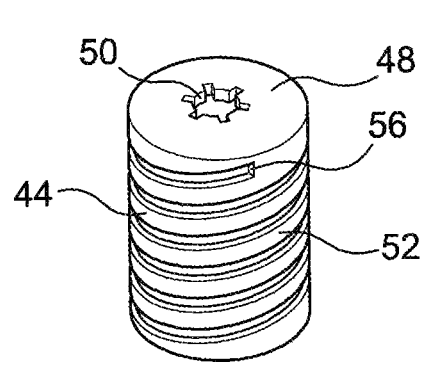
FIG. 6 is a perspective view of an element of an exemplary embodiment of the invention.

FIGS. 4 and 6 illustrate that interior tier cylinder 44 includes a top 48 across one end of the cylinder 44. The top 48 has an opening 50 that is shaped to match the diametrical shape of the rod 38. As noted above, in the preferred embodiment 10, the rod 38 has six (6) ribs disposed about the rod 38 that run its length with the ribs being in parallel and spaced equidistant from each other. In diametrical shape, this configuration of ribs forms a six pointed star. To correspond to the diametrical shape of the rod 38, the opening 50 in the top 48 of the interior tier cylinder 44 is shaped to match as a six pointed star.

In the exemplary embodiment 10, the rod 38 may translate the activation of the screw cap 34 to other elements of the embodiment 10. Specifically, as the screw cap 34 is turned, so is the rod 38 because the rod 38 is attached to the underside of the screw cap 34. When the rod 38 turns, the ribs of the rod 38 work with the opening 50 in the interior tier cylinder 44 to cause turning of the interior tier cylinder 44. In the preferred embodiment 10, the screw cap 34 may be turned in either of two directions. No matter which direction the screw cap 34 is turned, its turning turns the ribbed rod 38, which in turn, turns the interior tier cylinder 44 in the same direction as the ribbed rod 38. The result of the turning of the interior tier cylinder 44 is described in further detail below.

FIG. 6 shows an example of an interior tier cylinder 44 including its cylindrical body 47. The interior tier cylinder 44 also may be referred to as the "turning cylinder" or "first cylinder." The diameter of the interior tier cylinder 44 is slightly less than the diameter of the exterior tier cylinder 46 so the interior tier cylinder 44 may be nested within the exterior tier cylinder 46 in the rest or nested position of the tofu press 10. Also, the diameter of the interior tier cylinder 44 is slightly less than the diameter of the exterior tier cylinder 46 to allow the cylinders 44, 46 to screw and unscrew with respect to each other as is explained below.

Referring to FIG. 6 again, it shows the interior tier cylinder 44. The outside of the cylindrical body 47 of the interior tier cylinder 44 is "threaded" or has a "turning thread." The thread 52 (also referred to as "threads") are thin, continuous protrusions from the cylindrical body 47 of the interior tier cylinder 44 that encircle the cylindrical body 47 with the thread 52 having a downward angle so the thread 52 wraps downwardly from near the top 48 of the interior tier cylinder 44 around the cylindrical body 37 of the interior tier cylinder 44 to near its bottom. Between the protrusions 52 are the grooves 54 or troughs of the thread 52. The downwardly angled thread 52 allows the interior tier cylinder 44 to move in a screw like manner up and down with respect to the exterior tier cylinder 46 of the telescoping extender 40 as is explained below. The interior tier cylinder 44 may be made of any appropriate material such as plastic. The thread 52 of the cylinder 44 may be made integrally with the cylinder 44 or may be added to the cylinder 44.

In the exemplary embodiment 10, the interior tier cylinder 44 includes a pair of stops in the thread to hold the interior tier cylinder 44 within the exterior tier cylinder 46 as is explained further below. However, FIG. 6 only shows one of the stops. In particular, stop 56 is located in the thread 52 near the top 48 of the interior tier cylinder 44. The other unseen stop is located about 180 degrees opposite to stop 56 or on the back of the interior tier cylinder 44 as it is shown in FIG. 6. Both stops, as described below, aid in holding the interior tier cylinder 44 to the exterior tier cylinder 46 when the interior tier cylinder is substantially unscrewed or unnested from the exterior tier cylinder 46 to extend inside the interior box 14 as part of the tofu pressing process.

Figure 7:
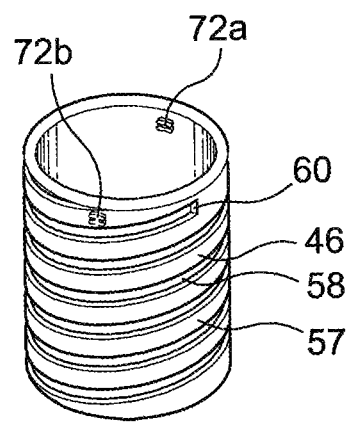
FIG. 7 is a perspective view of an element of an exemplary embodiment of the invention.

FIG. 7 shows an example of an exterior tier cylinder 46 including its cylindrical body 57. The exterior tier cylinder 46 also may be referred as the "encompassing cylinder" or "second cylinder." The outside of the cylindrical body 57 of the exterior tier cylinder 46 is "threaded" or has an "encompassing thread" with a thread 58 like the thread 52 of the interior tier cylinder 44. Like the interior tier cylinder 44, the exterior tier cylinder 46 includes a pair of stops in its thread 58. However, only one of the stops (stop 60) is seen in FIG. 7. Particularly, the stop 60 is located in the thread 58 near the top of the exterior tier cylinder 46. The other unseen stop is located about 180 degrees opposite to stop 60 or on the back of the exterior tier cylinder 46 as it is shown in FIG. 7. Both stops, as is described below, aid in holding the exterior tier cylinder 46 to the inner collar 32 of the lid 24 when the exterior tier cylinder 47 is substantially unscrewed or unnested from the inner collar 32 to extend inside the interior box 14 as part of the tofu pressing process. A stop also may be referred to as a "thread stop."

FIG. 7 also illustrates in cutaway the two pairs of guidance nodes 72a, 72b that are disposed on the inside and near the bottom of the exterior tier cylinder 46. Each pair 72a, 72b protrudes slightly into the inside of the cylinder 46. As is explained below, the guidance nodes 72a, 72b aid in the screwing and unscrewing of the interior tier cylinder 44 with respect to the exterior tier cylinder 46. The two pairs of guidance nodes 72a, 72b also cooperate with the stops in the threads of the interior tier cylinder 44 to hold the top of the interior tier cylinder 44 connected to the bottom of the exterior tier cylinder 46 when the interior tier cylinder 44 has reached its maximum extension into the inside of the interior box 14 as is further explained below.

To continue with the description above of the user's assembly of the elements of the exemplary tofu press 10, once the user has inserted the rod 38 attached to the inside of the screw cap 34 through the opening 28 in the lid 24, the user then may place the interior tier cylinder 44 onto the rod 38 by inserting the rod 38 through the opening 50 in the top 48 of the interior tier cylinder 44. The user may move the interior tier cylinder 44 towards the inside of the screw cap 34 by pushing the interior tier cylinder 44 upward along the rod 38. The diameter of the interior tier cylinder 44 is less than the diameter of the inner collar 32 of the lid 24. So, at least the top 48 or more of the interior tier cylinder 44 may fit within the inner collar 32 of the lid 24.

Once the interior tier cylinder 44 is fit onto the rod 38 and moved up along the rod 38 as far as possible, the user then may fit the exterior tier cylinder 46 around the lower end of the rod 38. The user may move the exterior tier cylinder 46 up along the rod 38 towards the inner collar 32 of the lid 24.

In moving the exterior tier cylinder 46 towards the inner collar 32 of the lid 24, the top inside of the exterior tier cylinder 46 encounters the bottom outside of the interior tier cylinder 44 (previously mounted on the rod 38 and moved upwards as far as possible with respect to the inner collar 32). The diameter of the exterior tier cylinder 46 is slightly larger than the diameter of the interior tier cylinder 44. As the exterior tier cylinder 46 encounters the interior tier cylinder 44 when the exterior tier cylinder 46 is moved towards the inner collar 32 of the lid 24, the exterior tier cylinder 46 begins to move upward in a screw-like motion around the outside of the interior tier cylinder 44 towards the inner collar 32. Advantageously, in exemplary embodiment 10, the upward screw-like movement of the exterior tier cylinder 46 around the interior tier cylinder 44 is facilitated by a top double set of paired nodes on the inside of the exterior tier cylinder 46.

FIG. 4 is the only drawing to show a top set of paired nodes 61 disposed on the top inside of the exterior tier cylinder 46. The other unseen top set is disposed 180 degrees opposite to top set 61. Each top set of paired of nodes functions as guides for threading or screwing the exterior tier cylinder 46 onto and up along the outside of the interior tier cylinder 44. Each top set of paired nodes encompasses the thread 52 on the outside of the interior tier cylinder 44 and moves along the thread 52 as the exterior tier cylinder 46 is moved upward in a screw-like motion until at least part of the exterior tier cylinder 46 encompasses or nests with the interior tier cylinder 44. Even though the exterior tier cylinder 46 has a slightly larger diameter than the diameter of the interior tier cylinder 44, the interior tier cylinder 44 is longer than the exterior tier cylinder in the exemplary embodiment 10. Thus, the exterior tier cylinder 46 may screw up along the outside of the interior tier cylinder 44, but because the exterior tier cylinder 46 is shorter than the interior tier cylinder 44, a bottom portion of the interior tier cylinder 44 may extend below the exterior tier cylinder 46.

There is an alternative to the process described above in assembling the two tier telescoping extender. Instead of separately mounting the interior tier cylinder 44 and then the exterior cylinder 46 onto the ribbed rod 38 and moving them into their nested positions within (at least partially) the inner collar 32, the interior tier cylinder 44 and the exterior cylinder 46 may be screwed or nested together prior to mounting in the ribbed rod 38.

Besides the surrounding of at least part of the interior tier cylinder 44 by the exterior tier cylinder 46, there is another encompassing or nesting that proceeds in assembling the exemplary tofu press 10 for use. This additional nesting relates to the inner collar 32 of the lid 24 and the nested interior and exterior tier cylinders 44, 46. Specifically, as the exterior tier cylinder 46 surrounds at least part of the interior tier cylinder 44, the top outside of the exterior tier cylinder 46 encounters the bottom inside of the inner collar 32 of the lid 24.

Figure 5:
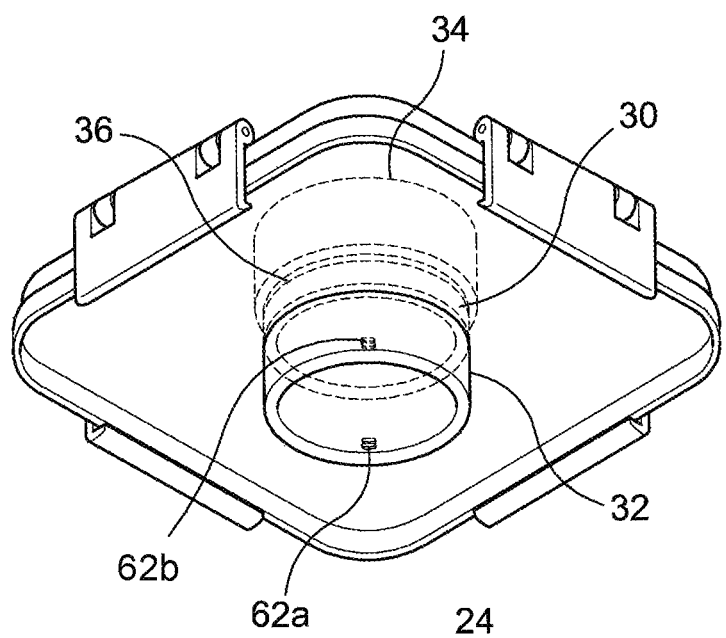
FIG. 5 is a perspective view of elements of an exemplary embodiment of the invention.

The outside of the exterior tier cylinder 46 includes a screw thread 58 as previously explained. The inside of the inner collar 32, as shown in FIG. 5, includes a double set of paired collar nodes 62a, 62b. The collar nodes 62a, 62b are disposed near the inside bottom of the inner collar 32 and are located about 180 degrees from each other. The collar nodes 62a, 62b engage the thread 58 of the exterior tier cylinder 46 near its top and assist in screwing the exterior tier cylinder 46 at least in part into a nested position with at least the top of the exterior tier cylinder 46 surrounded by the inner collar 32. The diameter of the exterior tier cylinder 46 is just slightly less than the diameter of the inner collar 32 so the exterior tier cylinder 46 may be screw fit at least partially within the inner collar 32.

Figure 8A:
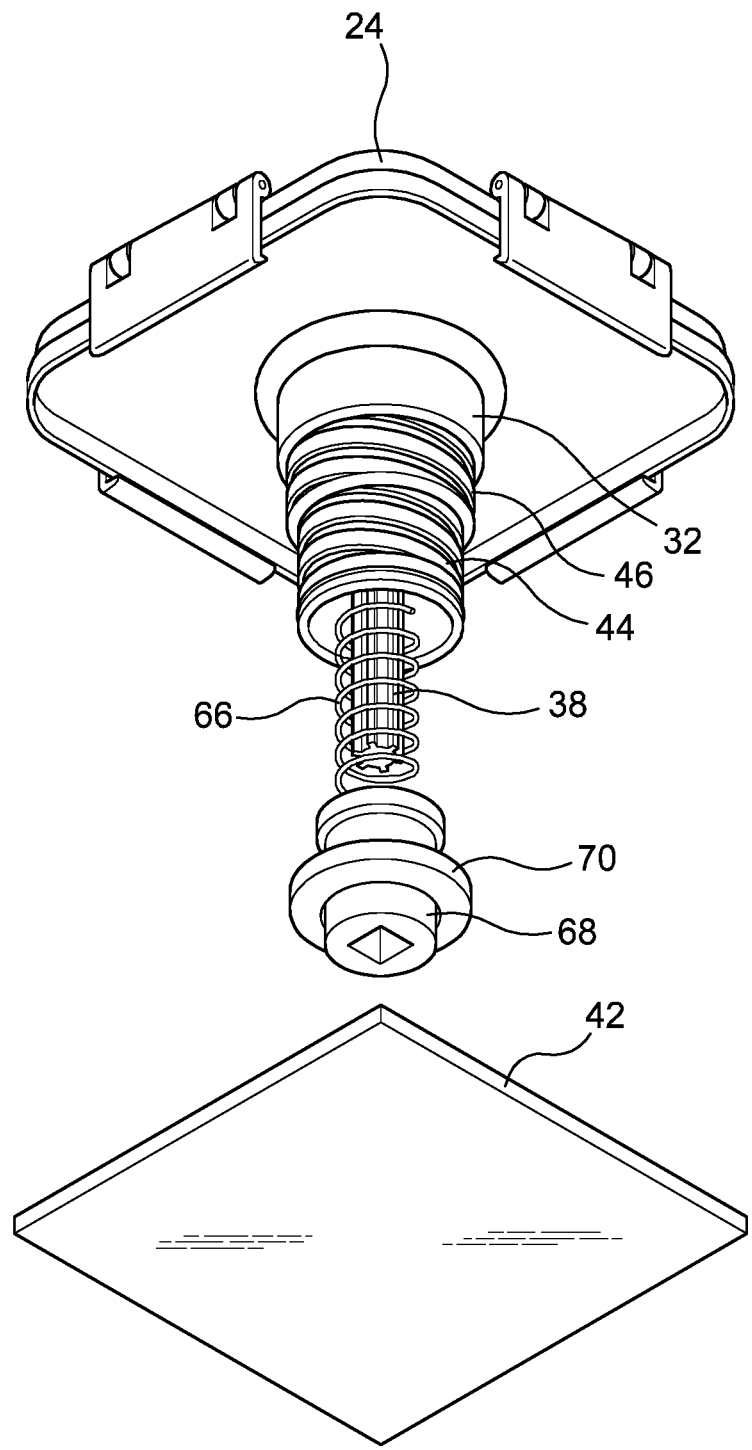
FIG. 8A is a perspective exploded view of elements of an exemplary embodiment of the invention.
Figure 8B:
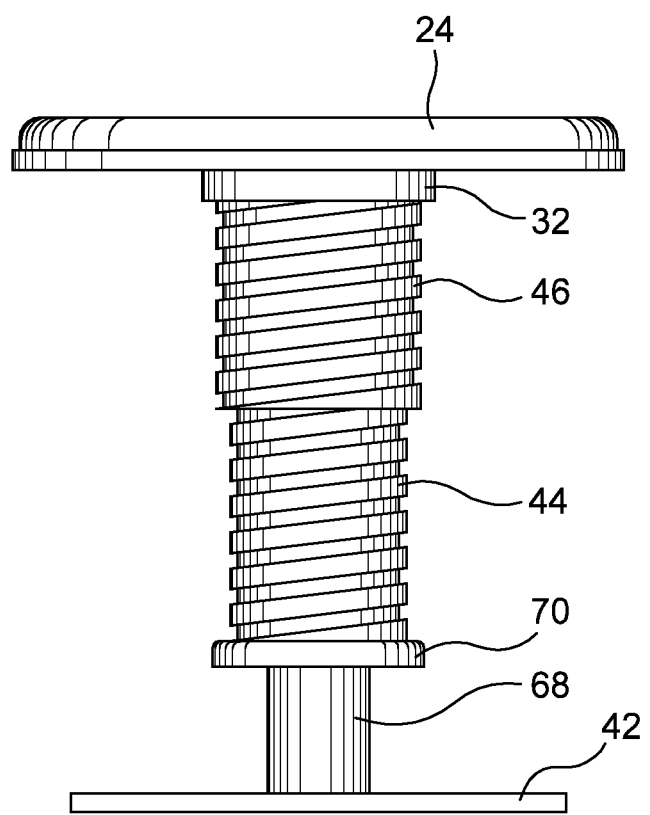
FIG. 8B is a perspective view of elements of an exemplary embodiment of the invention.

Thus, the user may have assembled certain elements of the exemplary tofu press 10 as per the description above and these assembled elements may be seen in FIG. 8A. As seen in that exploded drawing, the cover 24 of the exemplary tofu press 10 includes an inner collar 32 to the opening 28 in the cover 24. Nested at least partly in the inner collar 32, the exterior tier cylinder 46 surrounds at least in part the interior tier cylinder 44. With the interior and exterior tier cylinders 44, 46 at least partially nested within each other and within the inner collar 32, the ribbed rod protrudes through the inner collar 32, and the interior and exterior tier cylinders 44, 46 as may be seen in FIG. 8A.

The user may continue with assembly of the exemplary tofu press 10 as follows. The user may thread a spring 66 onto the ribbed rod 38. Preferably, the diameter of the spring 66 is slightly larger than the diameter of the rod 38, but less than the diameter of the interior tier cylinder 44 into the inside of which the spring 66 may be fit. The user may cap the end of the spring 66 encircling the ribbed rod 38 with a cone-shaped cap 68. It may be referred to as a "support." Mounted on the ribbed rod 38, the cone-shaped cap 68 may be pushed upward along the ribbed rod 38 towards the inner collar 32 so as to compress the spring 66 at least in part within the interior tier cylinder 44. At the point when the cone-shaped cap 68 moves no further towards the inner collar 32, a ring 70 may be threaded over the cone-shaped cap 68 to connect with the interior tier cylinder 44 so as to hold the cone-shaped cap 68 in place with respect to the other elements of the exemplary tofu press 10.

As noted, the exemplary tofu press 10 uses a cone-shaped cap 68, but other embodiments may substitute elements. Also, a ring 70 is used to attach the cone-shaped cap 68, but other embodiments may employ other means. The cone-shaped cap 68 and the ring 70 may be of any appropriate material such as plastic.

As the next step in the assembly of the exemplary tofu press 10, the user may attach the pressing plate 42 to the end of the cone-shaped cap 68 opposite to that end of the cone-shaped cap 68 connected to the interior tier cylinder 44. In other words, the pressing plate 42 may be attached to the "pointy" end of the cone-shaped cap 68. Notably, by its attachment to the cone-shaped cap 68, the pressing plate 42 moves with other elements of the exemplary tofu press 10 in extending into the inside of the interior box to press the tofu 13 and in retracting from the extension.

The pressing plate 42 also may be referred to as a "press board," "pressure plate," "press plate," or "horizontal plate." The pressing plate 42 is that part of the exemplary tofu press 10 that encounters the tofu 13 and exerts pressure on the tofu 13 by the pressing plate 42 being progressively moved against the tofu 13 so the tofu 13 is squeezed or pressed to release at least some of its liquid. In the exemplary tofu press 10, the pressing plate 42 is generally rectangularly shaped and is horizontally or perpendicularly positioned with respect to the vertically extending ribbed rod 38 of the exemplary tofu press 10. The pressing plate 42 in the exemplary embodiment 10 is almost as large as the horizontal dimensions of the interior box 14. By having a size almost as large as the horizontal dimensions of the interior box 14, the pressing plate 42 is able to press on all of the tofu 13 in the interior box 14 no matter how the tofu 13 is distributed in the interior box 14. The pressing plate 42 is relatively thin compared to its horizontal dimensions. The pressing plate 42 may be made of any appropriate material. Of course, other embodiments may vary with respect to features of a pressing plate 42.

To summarize the assembly of elements of the exemplary tofu press 10 at this point, the user has placed a block of tofu 13 in the bottom of the interior box 14, which has been inserted into the exterior box 22. The user has attached ribbed rod 38 to the inside bottom of the screw cap 34 with the ribbed rod 38 extended through the opening 28 in the cover 24. The interior tier cylinder 44 has been mounted on the ribbed rod 38 with the interior tier cylinder also having been moved upwards along the ribbed rod 38 to be at least partly surrounded by the inner collar 32 of the lid 24. The exterior tier cylinder 46 also has been mounted on the ribbed rod 38 and has been moved upwards along the ribbed rod 38 until the exterior tier cylinder 46 encountered the interior tier cylinder 44 and surrounded it in a screwing or threaded motion until the exterior tier cylinder 46 reached the inner collar 32. The exterior tier cylinder 46 screwed itself upwards towards the lid 24 into being at least partially surrounded by the inner collar 32 and at the same time at least partially surrounding the inner tier cylinder 44. As a result of the nesting of the interior and exterior tier cylinders 44, 46 at least partially within each other and within the inner collar 32, the ribbed rod 38 protrudes past the interior and exterior tier cylinders 44, 46 away from the lid 24. A spring 66 is mounted about the ribbed rob 38 and compressed by a cone 68 positioned at about the end of the ribbed rod 38. The cone 68 compresses the spring 66 on the rod 38 with the cone 68 being fixed in place with respect to the interior tier cylinder 44 by a ring 70. The end of the spring-loaded cone 68 opposite to its connection to the interior tier cylinder 44 is attached to a pressure plate 42.

To press the tofu 13, the user activates the screw cap 34 by turning it in a first direction, which in turn, turns the ribbed rod 38 in the first direction, and also turns the interior tier cylinder 44 in the first direction. The turning of the interior tier cylinder 44 in the first direction causes the interior first cylinder 44 to move downwards into the inside of the interior box 14 out of its nested (at least in part) position within the exterior tier cylinder 46. Specifically, the interior tier cylinder 44 unscrews out of its (at least partial) nested position within the exterior tier cylinder 46. The unscrewing of the interior tier cylinder 44 out of its (at least partial) nested position may be facilitated by a double set of nodes (not illustrated in the drawings) on the inside of the exterior tier cylinder 46 that guide the unscrewing of the interior tier cylinder 44 from its (at least partially) nested position to a fully extended position with respect to the exterior tier cylinder 46. By "fully extended position" is meant that the interior tier cylinder 44 protrudes into the inside of the interior box 14 as far as it can while being connected to the exterior tier cylinder 46. Advantageously, the interior tier cylinder 44 is retained at about its top to about the bottom of the exterior tier cylinder 46. The interior tier cylinder 44 remains connected at its longest extension into the inside of the interior box 14 by the stop(s) 56 in the threads of the interior tier cylinder 44 that interact with the two sets of paired nodes 72a, 72b inside and near the bottom of the exterior tier cylinder 46. The stop(s) 56 and nodes 72a, 72b combine to halt the interior tier cylinder 44 from screwing completely out of the exterior tier cylinder 46.

As the user continues to turn the screw cap 34 in the first direction, the ribbed rod 38 continues to turn and to turn the interior tier cylinder 44, but as noted in the paragraph immediately above, the interior tier cylinder 44 has reached its fully extended position into the inside of the interior box 14. As a result of the stopped connection of the interior tier cylinder 44 to the exterior tier cylinder 46, the exterior tier cylinder 46 commences to turn in the first direction with the continued turning of the ribbed rod 38 via the screw cap 34. The turning of the exterior tier cylinder 46 in the first direction causes it to unscrew from its (at least partially) nested position out of the inner collar 32 of the lid 24 and further into the inside of the interior box 14, thereby lengthening the extension of the interior tier cylinder 44 and associated elements including the spring-loaded cone 68 and press plate 42 into the inside of the interior box 14.

The unscrewing of the exterior tier cylinder 46 out of its (at least partial) nested position within the inner collar 32 may be facilitated by a double set of unscrewing nodes (not illustrated in the drawings) near the top and on the inside of the inner collar 32 that guide the unscrewing of the exterior tier cylinder 46 from its (at least partially) nested position to a fully extended position with respect to the inner collar 32. By "fully extended position" is meant that the exterior tier cylinder 46 protrudes into the inside of the interior box 14 as far as it can while being connected to the inner collar 32. Advantageously, the exterior tier cylinder 46 is retained at about its top to about the bottom of the inner collar 32. The exterior tier cylinder 46 remains connected at its greatest extension into the inside of the interior box 14 by interaction of the stop(s) 60 of the exterior tier cylinder 46 and the collar nodes 62a, 62b of the inner collar 32. The stop(s) 60 and nodes 62a, 62b combine to halt the exterior tier cylinder 46 from screwing completely out of the inner collar 32.

With the interior tier cylinder 44 and the exterior tier cylinder 46 both extended at their limit, the telescoping extender is fully extended into the inside of the interior box 14. This complete extension may be unnecessary for various reasons as explained below.

As noted, the user may activate the pressing of the tofu 13 by turning the screw cap 34 in a first direction which causes the interior tier cylinder 44 to progressively unscrew from its nested position as the screw cap 34 is turned into the inside of the interior box 14, and then the continued turning of the screw cap 34 in the first direction causes the exterior tier cylinder 46 to progressively unscrew from its nested position. The extensions of the cylinders 44, 46 into the inside of the interior box cause the pressure plate 42 to move progressively towards, and at some point to engage and then may press on the tofu 13.

An advantage of the invention is the user may feel the engagement of the pressure plate 42 with the tofu 13 through the telescoping extender and other elements of the tofu press 10. As a result of feeling the engagement with the tofu 13, the user may continue to progressively extend the telescoping extender and associated elements, but may take care in such progressive extension to minimize or eliminate the distortion or cracking of the tofu 13. For example, the user may turn the screw cap 34 more slowly when the user feels the tofu 13 has been engaged so as to slow the pressing of the tofu 13 by slowing the extension of the telescoping extender and associated elements into the inside of the interior box 14.

With the continued turning of the screw cap 34 in the first direction by the user, the pressing plate 42 continues progressively to extend into the interior box 14 and to press more on the tofu 13. As the pressure on the tofu 13 mounts, the tofu 13 releases liquid so the tofu 13 may contract in height. When the user decides sufficient liquid has been removed from the tofu 13, the user may cease turning the screw cap 34 in the first direction to cease additional movement or pressing of the pressing plate 42 against the tofu 13. Alternatively, the telescoping extender and associated elements may reach their extension limits prior to the user making a decision to cease turning the screw cap 34 so further turning of the screw cap 34 in the first direction has no further extension results and no further additional pressure exerted on the tofu 13.

At either point, the user may decide to remove the pressed tofu 13 from the exemplary tofu press 10. To do so, the user may begin removal of the telescoping extender and associated elements from inside the interior box 14. A quick way to remove the telescoping extender and associated elements is to simply unfasten the fasteners 26a, 26b, 26c, 26d on the lid 24 and pull the lid 24 with the telescoping extender and associated elements in an extended position through the opening 28 in the lid 24 out of the inside of the interior box 14. The user then may remove the interior box 14 and retrieve the drained tofu 13.

An alternative way to remove the telescoping extender and associated elements from the interior box 14 is to retract them to their nested position. As with the extension of the telescoping extender and associated elements, their retraction may be progressive. To begin the retraction, the user may twist the screw cap 24 in a second direction opposite to the first direction. Twisting the screw cap 24 in the opposite direction causes the ribbed rod 38 extending from the screw cap 34 into the interior tier cylinder 44 of the telescoping extender to cause the interior tier cylinder 44 to turn and progressively move itself via its screw thread towards its nested position within the exterior tier cylinder 46, thereby pulling the connected spring-loaded cap 68 and the pressure plate 42 progressively along towards the top of the interior box 14.

When the interior tier cylinder 44 returns to its nested position within the exterior tier cylinder 46 of the telescoping extender, as the screw cap 34 continues to be turned in the second direction by the user, the exterior tier cylinder 46 then moves progressively via its screw thread to its own nested position within the inner collar 32 of the opening 28 in the lid 24 covering the nested pair of boxes 14, 22. The upward movement of the exterior tier cylinder 46 pulls the pressure plate 42 with spring-loaded cap 68 progressively along towards the top of the interior box 14. The user then may unfasten the lid 24 from the nested pair of boxes 24, 22 and remove the screw cap 34 with telescoping extender and associated elements from inside the interior box 14. Of course, the user does not have to retract the telescoping extender and associated elements all the way possible towards their nesting position, but may stop the retraction, unfasten the fasteners 26a, 26b, 26c, 26d, and lift the lid 24 away to reveal the interior box 14 with the drained tofu 13.

The user may choose to lift the interior box 14 out of the exterior box 22, thereby lifting the tofu 13 removed of at least some of its liquid in the interior box 14 but leaving the removed liquid in the exterior box 22 to which the removed liquid has drained through the holes 16a, 26b, 16n in or near the bottom of the interior box 14. To use the tofu 13 removed of at least some of its liquid, the user then may remove the tofu 13 from the interior box 14. The user may be rid of the removed liquid (or use it for another purpose) by pouring the removed liquid out of the exterior box 22.

Advantageously, after the pressed tofu 13 is removed from the interior box 14 of the exemplary tofu press 10 and the drained liquid is removed from the exterior box 22, there is minimal clean up required of the exemplary tofu press 10.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the United States Patent and Trademark Office and the public generally, and especially the scientists, engineers and practitioners in the art who are not familiar with patent or legal terms or phraseology, to determine quickly from a cursory inspection the nature and essence of the technical disclosure of the application.

What is claimed is:

1. An apparatus for removing liquid from tofu, comprising:
an open topped nested double-box set including an exterior box and an interior box for containing the tofu with the interior box being insertable into and removable from within the exterior box, wherein the interior box comprises at least a drain for draining liquid removed from the tofu out of the interior box;

a cover for covering and releasably attaching to the open topped nested double-box set, wherein the cover includes an inner collar and at least one collar node disposed on an inside surface of the inner collar;

a telescoping extender extending generally vertically into the inside of the interior box, the extender attached at one end to the inside of the inner collar of the cover and attached at the other end to a horizontal pressure plate, the extender having a rotatable interior tier cylinder nested within a rotatable exterior tier cylinder, the extender being activatable to become longer by telescoping the interior tier cylinder out of the exterior tier cylinder, and the extender thereby extending the pressure plate further into the inside of the interior box to press on the tofu to cause the tofu to release the liquid; and an activator disposed on and connected through the cover to the extender for activating the extender, whereby the liquid is removed from the tofu by the pressure plate being extended by the extender into the inside of the interior box to press on the tofu, and wherein the at least one collar node engages a thread of the exterior tier cylinder to assist in screwing part of the exterior tier cylinder into a nested position within the inner collar.

2. The apparatus of claim 1, wherein the at least one drain is in or near the bottom of the interior box.

3. The apparatus of claim 2, wherein the interior box comprises at least a spacer disposed under the bottom of the interior box for creating a space between the bottom of the interior box and the inside bottom of the exterior box with the space for containing the removed liquid drained from the interior box.

4. The apparatus of claim 3, wherein the spacer disposed under the bottom of the interior box comprises a resilient spacer for cushioning the tofu when the tofu is pressed by the pressure plate.

5. The apparatus of claim 1, wherein the extender is activatable by the activator to become progressively longer by the extender progressively telescoping the interior tier cylinder out of the exterior tier cylinder thereby progressively extending the pressure plate further into the inside of the interior box to progressively press more on the tofu to cause the tofu to release more of the liquid; and wherein the extender is de-activatable by the activator at any point along the progressive lengthening of the extender to stop further press by the pressure plate on the tofu.

6. The apparatus of claim 1, wherein the collar comprises a collar tier of the telescoping extender;

wherein the interior tier cylinder and the exterior tier cylinder, with the interior tier cylinder nested within the exterior tier cylinder, nest within the collar tier; and wherein the extender being activatable to become longer by telescoping the interior tier cylinder out of the exterior tier cylinder and by telescoping the exterior tier cylinder out of the collar tier.

7. The apparatus of claim 1, wherein the cover comprises an opening into the inside of the interior box; and wherein the activator comprises a screw cap covering the opening in the cover and connecting to the extender for activating the extender.

8. The apparatus of claim 1, wherein the extender further comprises a spring-loaded cap disposed above and attached to the pressure plate; and wherein the spring-loaded cap acts as a shock absorber with respect to the pressure plate pressing on the tofu.

9. An apparatus for controllably removing at least some liquid from tofu and containing at least some of the removed liquid, comprising:

an outer container having an interior and an open top;

an inner container for holding the tofu, the inner container fitting into the interior of the outer container, the inner container having at least a drain in or near the bottom of the inner container, and the inner container having a means for raising the inner container above the inside bottom of the interior of the outer container to create a space to contain at least some of the liquid removed from the tofu;

a lid for releasably covering the open top of the outer container;

a horizontal rotatable element on a top of the lid;

a collar downwardly protruding from an inside of the lid, the collar having at least one node protruding into the inside of the collar; and a means for pressing the tofu to remove the liquid from the tofu, the means for pressing being connected to the underside of the lid so the means for pressing extends into the interior of the inner container to a neutral, non-pressing distance, the means for pressing being extendable further into the interior of the inner container to press the tofu to cause removal of at least some liquid from the tofu with at least some of the removed liquid draining from the inner container into the space between the bottom of the inner container and the bottom of the outer container, and the means for pressing being retractable to the neutral, non-pressing distance, wherein the means for pressing comprises a turning cylinder and an encompassing cylinder having an encompassing thread on the outside of the encompassing cylinder for engaging the at least one node.

10. The apparatus of claim 9, wherein the means for raising the inner container above the inside bottom of the interior of the outer container comprises two or more resilient feet disposed on the outside bottom of the inner container, whereby the resiliency of the feet assists in minimizing deforming the tofu when pressed.

11. The apparatus of claim 9, wherein the means for pressing further comprises a horizontal plate for pressing the top of the tofu in the inner container.

12. The apparatus of claim 9, wherein the means for pressing is removable from the interior of the inner container; and wherein the inner container is removable from the outer container, whereby the liquid removed from the tofu and contained in the space is removable from the space by pouring the removed liquid from the outer container.

13. The apparatus of claim 9, wherein the means for pressing further comprises:

a rod engaged at one end with the horizontally rotatable element,
the rod extending through the lid into the interior of the inner container, and
the rod cooperating with the horizontally rotatable element to turn when the horizontally rotatable element is turned.

14. The apparatus of claim 13, wherein the horizontally rotatable element on the lid comprises a screw top covering an opening in the lid into the interior of the outer container.

15. The apparatus of claim 13, wherein the means for pressing further comprises:
the turning cylinder having a top with an opening,
the opening in the top of the turning cylinder receiving the rod into the interior of the turning cylinder, and
the opening in the top of the turning cylinder cooperating with the rod so the turning cylinder turns when the horizontally rotatable element turns the rod, and
the turning cylinder having a turning thread on the outside of the turning cylinder spiraled downwardly from near the top of the turning cylinder to near the bottom of the turning cylinder;
the encompassing cylinder having the encompassing thread on the outside of the encompassing cylinder spiraled downwardly from near the top of the encompassing cylinder to near the bottom of the encompassing cylinder,
the encompassing cylinder having at least an encompassing top node on and protruding into the inside of the encompassing cylinder near the top of the encompassing cylinder,
the encompassing cylinder having at least an encompassing bottom node on and protruding into the inside of the encompassing cylinder near the bottom of the encompassing cylinder, and
the encompassing cylinder having at least an encompassing stop on and protruding into the inside of the encompassing cylinder near the bottom of the encompassing cylinder;
the turning cylinder being positionable within the encompassing cylinder for the neutral, non-pressing distance by screwing the turning cylinder in a first direction into the encompassing cylinder using the encompassing top node and the encompassing bottom node of the encompassing cylinder to guide the thread on the outside of the turning cylinder;
the turning cylinder being extendible from the neutral, non-pressing distance further into the interior of the inner container so long as the horizontally rotatable element rotates to turn the rod which turns the turning cylinder in a second direction so the turning cylinder unscrews from the encompassing cylinder with a guidance of the encompassing top node and the encompassing bottom node of the encompassing cylinder until the encompassing stop, protruding into the inside of the encompassing cylinder near the bottom of the encompassing cylinder, stops the unscrewing of the turning cylinder and leaves the turning cylinder connected to the encompassing cylinder;
a horizontal plate connected on its top side to the end of the turning cylinder,
the plate moving with the turning cylinder to the neutral, non-pressing distance when the turning cylinder is positioned within the encompassing cylinder within the collar,
the plate extending further into the interior of the inner container in response to the turning cylinder extending further into the interior of the inner container, and
the underside of the plate pressing the top of the tofu in the inner container when the plate is extended to reach the tofu and exerting more pressure on the tofu as the plate continues to extend further into the interior of the inner container until the turning cylinder and the encompassing cylinder stop unscrewing from the collar and from each other.

16. A tofu press, comprising:
a press board;
a container for holing a tofu;
a lid having a central opening with a collar extending upward from the circumference of the central opening with a string rail formed around the outer surface of the collar;
a round cap with the inside circular wall of the cap divided between a circular upper valence and a circular lower valence,
the circular upper valence having a circular line of nodes,
the circular lower valence having inner peripheral surface nodes;
the round cap being attachable to the collar by the circular line of nodes interacting with the string rail of the collar allowing the round cap to freely rotate in either direction about the collar;
a ribbed rod extending downwardly from the inside center of the cap;
a first extender having a base and a first cylinder extending from the outer periphery of the base,
the base having an opening to receive the ribbed rod therethrough,
the first cylinder having a threaded outer surface,
the threaded outer surface of the first cylinder having a pair of thread stops respectively at an upper part and a lower part of the threaded outer surface,
the thread stops at the upper part being max-spaced from each other at the end of a chosen diameter line, and
the thread stops at the lower part being max-spaced from each other at the opposite end of the chosen diameter line;
a second extender having an inner peripheral surface and a threaded outer peripheral surface,
a line of nodes formed on the inner peripheral surface of the second extender to fit in a trough of the threaded outer peripheral surface of the first extender to control threading of the first extender against the second extender and contain the threading between the thread stop pair at the upper part of the first extender and the thread stop pair at the lower part of the first extender;
the first extender being rotatable by rotation of the round cap to threadedly lower from the base until the upper thread stops of the first extender become hooked by the nodes on the inner peripheral surface of the second extender,
the second extender being rotatable in response to continued rotation of the round cap to threadedly lower from the base until the upper thread stops of the second extender become hooked by the nodes on the inner peripheral surface of the lower valance of the lid; and
a spring having a top and a bottom,
the top of the spring being worn over the rod and in contact with a lower surface of the lid, and the bottom of the spring being covered by a support attached to the press board, whereby the rotation of the cap moves the first extender away from the base which further moves the second extender away from the base so the top of the spring in contact with the lower surface of the lid elastically moves away from the base so the support pushes down the press board to press a tofu block.

\* \* \* \* \*